United States Patent
Kikuchi

(10) Patent No.: US 9,337,678 B2
(45) Date of Patent: May 10, 2016

(54) BATTERY BLOCK, AND POWER SOURCE SYSTEM

(75) Inventor: Jun Kikuchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 194 days.

(21) Appl. No.: 14/235,411

(22) PCT Filed: May 1, 2012

(86) PCT No.: PCT/JP2012/002961
§ 371 (c)(1),
(2), (4) Date: Jan. 27, 2014

(87) PCT Pub. No.: WO2013/014835
PCT Pub. Date: Jan. 31, 2013

(65) Prior Publication Data
US 2014/0167698 A1 Jun. 19, 2014

(30) Foreign Application Priority Data

Jul. 28, 2011 (JP) ................................. 2011-165381

(51) Int. Cl.
| | | |
|---|---|---|
| *H02J 7/00* | (2006.01) | |
| *B60L 11/18* | (2006.01) | |
| *H01M 10/44* | (2006.01) | |

(52) U.S. Cl.
CPC ............ *H02J 7/0063* (2013.01); *B60L 11/1853* (2013.01); *B60L 11/1866* (2013.01);
(Continued)

(58) Field of Classification Search
CPC ............ H02M 3/158; H02M 3/33546; H02M 3/33592; H01M 10/482; H01M 10/44; H01M 10/486; H01M 10/4207; H01M 10/4257; Y02T 10/7011; Y02T 10/7005; Y02T 10/7044; Y02T 10/705; H02J 7/0052; H02J 7/0004
USPC ................................. 320/116–123
See application file for complete search history.

(56) References Cited

U.S. PATENT DOCUMENTS

| | | | | |
|---|---|---|---|---|
| 6,501,249 | B1* | 12/2002 | Drori ................. | G01R 31/3613 320/149 |
| 2005/0077874 | A1 | 4/2005 | Nakao | |
| 2006/0139005 | A1* | 6/2006 | Niculae ................. | H02J 7/0013 320/132 |

(Continued)

FOREIGN PATENT DOCUMENTS

| | | |
|---|---|---|
| EP | 2 043 221 A2 | 4/2009 |
| JP | 2001-095169 A | 4/2001 |

(Continued)

OTHER PUBLICATIONS

International Search Report issued in International Application No. PCT/JP2012/002961 with Date of mailing Jun. 5, 2012, with English Translation.

(Continued)

*Primary Examiner* — Binh Tat
(74) *Attorney, Agent, or Firm* — McDermott Will & Emery LLP

(57) ABSTRACT

A battery block for use in a power source system including battery blocks is provided with: a secondary battery; a communication circuit which outputs voltage information outside, the voltage information relating to a terminal voltage Vt of the secondary battery; a communication circuit which acquires the voltage information output from another battery block as other voltage information; and a discharge controller which discharges the secondary battery in a host battery block when a host voltage, which is the terminal voltage Vt of the secondary battery in the host battery block, is higher than a terminal voltage indicated by the other voltage information.

8 Claims, 9 Drawing Sheets

(52) U.S. Cl.
CPC ........... *H01M10/441* (2013.01); *H02J 7/0018* (2013.01); *B60L 2240/547* (2013.01); *B60L 2240/549* (2013.01); *Y02T 10/7005* (2013.01); *Y02T 10/7055* (2013.01); *Y02T 10/7061* (2013.01); *Y02T 90/16* (2013.01)

(56) References Cited

U.S. PATENT DOCUMENTS

| | | | |
|---|---|---|---|
| 2007/0108946 A1* | 5/2007 | Yamauchi | H01M 10/42 320/132 |
| 2008/0169789 A1 | 7/2008 | Yamabe | |
| 2011/0080138 A1 | 4/2011 | Nakanishi | |

FOREIGN PATENT DOCUMENTS

| | | |
|---|---|---|
| JP | 2003-174738 A | 6/2003 |
| JP | 2008-178186 A | 7/2008 |
| JP | 2010-142040 A | 6/2010 |
| JP | 2010-154720 A | 7/2010 |
| JP | 2011-101573 A | 5/2011 |

OTHER PUBLICATIONS

Extended European Search Report issued in corresponding European Patent Application No. 12817812.6, on Jun. 15, 2015, 5 pages.

* cited by examiner

FIG. 4

| TIME | | BATTERY BLOCK | | | | |
|---|---|---|---|---|---|---|
| | | 2-A | 2-B | 2-C | 2-D | 2-E |
| TIMING | 1 | 4.12V | 4.10V | 4.08V | 4.10V | 4.04V |
| | 2 | 4.11V | 4.09V | 4.08V | 4.09V | 4.04V |
| | 3 | 4.10V | 4.09V | 4.08V | 4.08V | 4.04V |
| | 4 | 4.10V | 4.09V | 4.08V | 4.07V | 4.04V |
| | 5 | 4.10V | 4.09V | 4.08V | 4.06V | 4.04V |
| | 6 | 4.10V | 4.09V | 4.07V | 4.05V | 4.04V |
| | 7 | 4.10V | 4.08V | 4.06V | 4.05V | 4.04V |
| | 8 | 4.09V | 4.07V | 4.06V | 4.05V | 4.04V |
| | 9 | 4.08V | 4.07V | 4.06V | 4.05V | 4.04V |

# BATTERY BLOCK, AND POWER SOURCE SYSTEM

RELATED APPLICATIONS

This application is a national phase application of the U.S. National Phase under 35 U.S.C. §371 of International Application No. PCT/JP2012/002961, filed on May 1, 2012, which in turn claims the benefit of Japanese Application No. 2011-165381, filed on Jul. 28, 2011, the disclosures of which Applications are incorporated by reference herein.

TECHNICAL FIELD

The present invention relates to a battery block including a secondary battery, and to a power source system in which such battery blocks are connected.

BACKGROUND ART

In recent years, power source systems in which a large number of secondary batteries are connected in series to output a high voltage have been widely used. The power source system is typified by vehicular secondary batteries installed as power sources on hybrid cars using an engine together with an electric motor or electric automobiles. Such a power source system is configured by connecting a large number, for example, 80 cells to 500 cells, of secondary batteries in series. Therefore, the reliability of the entire battery system is difficult to ensure.

More specifically, in such a power source system, there is variation in the stored charge amount which is charged in the secondary batteries. The variation is due to variation in characteristics which occurs in a manufacturing process of secondary batteries constituting the power source system.

When the power source system is repeatedly charged and discharged in such a state where there is variation in the stored charge amount, the degradation of the secondary battery whose stored charge amount is small may be accelerated. More specifically, when charging the power source system, a secondary battery, which has greater charge amount than another secondary battery prior to charge, will be fully charged earlier than the other secondary battery. Therefore, this secondary battery is easily to be subjected to overcharge. Thus, there is a risk of accelerating degradation of a secondary battery with a greater stored charge amount. On the other hand, when discharging the power source system, a stored charge amount of a secondary battery, which has smaller charge amount than another secondary battery prior to discharge, will become zero earlier than the other secondary battery. Hence, this secondary battery is easily to be subjected to over-discharge. Thus, there is a risk of accelerating degradation of a secondary battery with a small stored charge amount.

In the secondary battery with accelerated degradation, capacity is reduced and service life is shortened. When some of the secondary batteries of the power source system are degraded, the entire power source system cannot be used and reliability is reduced. Therefore, the effect produced by the degradation of secondary batteries caused by the variation in the stored charge amount is large. For this reason, in a power source system using a large number of secondary batteries, it is desirable to equalize the stored charge amount among the secondary batteries, that is, equalize the terminal voltage among the secondary batteries.

A technique for equalizing the terminal voltage among secondary batteries is known, as described hereinbelow (see, for example, Patent Document 1).

With the technique described in Patent Document 1, the terminal voltage of the entire battery pack configured by connecting cells in series is divided by voltage-dividing resistors. The number of the resistors corresponds to the number of cells. As a result, the divided voltage becomes a voltage obtained by averaging the terminal voltages of the cells. The average voltage thus obtained is compared with the terminal voltage of each cell. The terminal voltages of the secondary batteries are equalized by discharging the cell with a terminal voltage higher than the average voltage.

However, the inconvenience associated with the technique described in Patent Document 1 is that when the number of cells used in a battery pack is changed, the number of voltage-dividing resistors or the resistance value thereof should be changed, which makes it difficult to change the number of cells.

Patent Document 1: Japanese Patent Application Publication No. 2001-95169

SUMMARY OF INVENTION

It is an object of the present invention to provide a power source system in which the number of secondary batteries may be changed easily while reducing the imbalance (variation) of terminal voltage between secondary batteries, and also to provide a battery block for use in such a power source system.

A battery block according to an aspect of the present invention is a battery block for use in a power source system including battery blocks, the battery block includes: a secondary battery; a voltage information output portion which outputs voltage information outside, the voltage information relating to a terminal voltage of the secondary battery; a voltage information acquisition portion which acquires the voltage information output from another battery block as other voltage information; and a discharge controller which causes the secondary battery in a host battery block to discharge when a host voltage is higher than a terminal voltage indicated by the other voltage information, the host voltage being the terminal voltage of the secondary battery in the host battery block.

A power source system according to another aspect of the present invention includes battery blocks, each of the battery blocks being the above-described battery block, wherein the voltage information output portion of each of the battery blocks outputs the voltage information to one other battery block; and the voltage information acquisition portion of each of the battery blocks acquires the other voltage information from one other battery block, which is different from the battery block to which the voltage information output portion of the host battery block has output the voltage information.

A power source system according to yet another aspect of the present invention includes battery blocks, each of the battery blocks being the above-described battery block, wherein the voltage information output portion of each of the battery blocks and the voltage information acquisition portion of each of the battery blocks are connected such that the voltage information output from each of the battery blocks affects all other battery blocks.

With the battery block and the power source system of such a configuration, the number of secondary batteries constituting a power source system may be easily changed while reducing the imbalance of terminal voltage between secondary batteries.

BRIEF DESCRIPTION OF DRAWINGS

FIG. 4 is an explanatory drawing for describing the operation of the power source system shown in FIG. 3.

DESCRIPTION OF EMBODIMENTS

Figure 1:
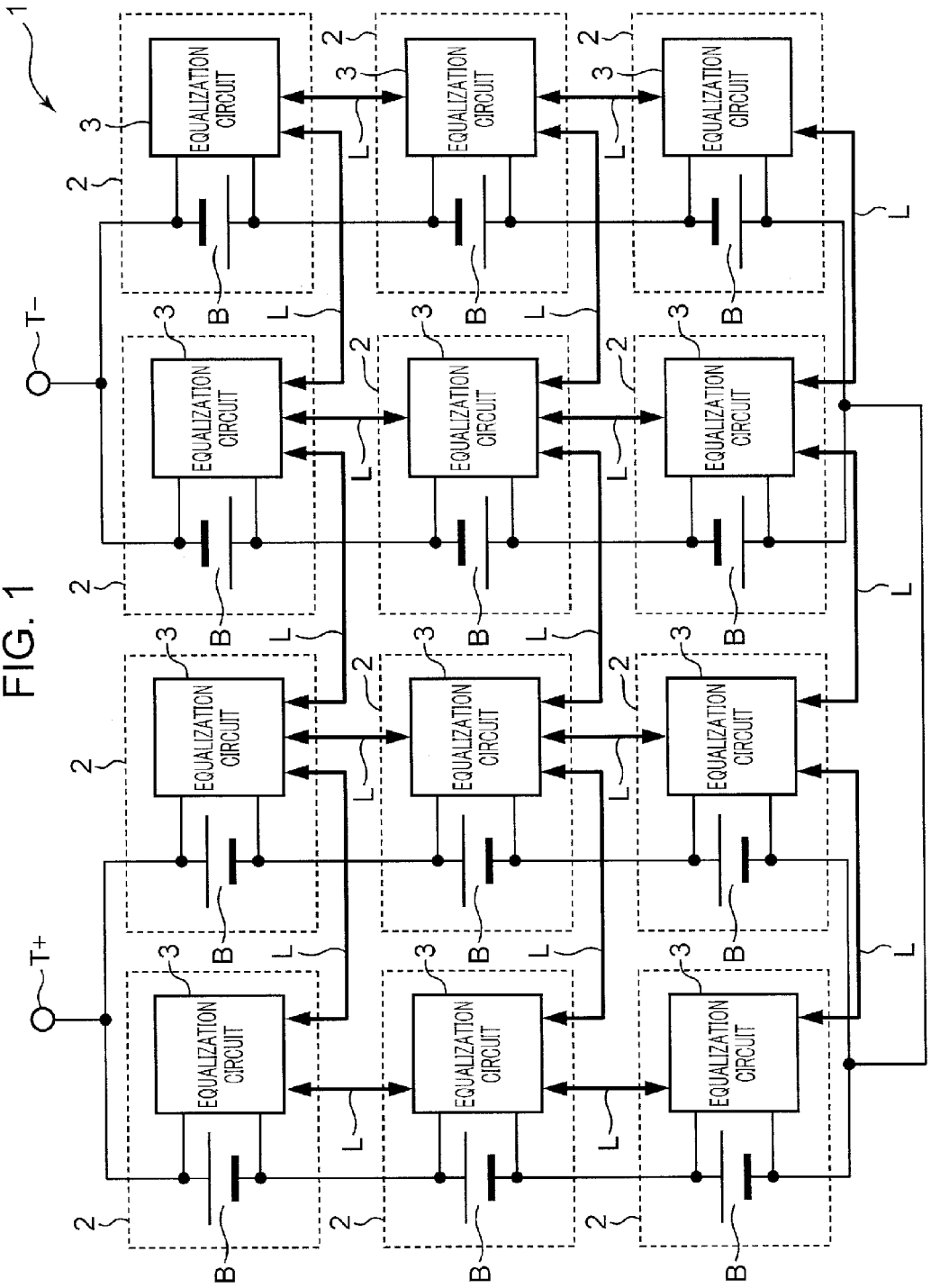
FIG. 1 is a block diagram illustrating an example of the configuration of the power source system according to the first embodiment of the present invention.

Embodiments of the present invention will be described below with reference to the drawings. In the drawings, like elements are assigned with like reference numerals and the description thereof is herein omitted.

(First Embodiment)

FIG. 1 is a block diagram illustrating an example of the configuration of the power source system according to the first embodiment of the present invention. A power source system 1 shown in FIG. 1 includes twelve battery blocks 2, for example. In the power source system 1, a parallel circuit configured by connecting in parallel a series circuit of three battery blocks 2 and a series circuit of three battery blocks 2, and a parallel circuit configured by connecting in parallel a series circuit of three battery blocks 2 and a series circuit of three battery blocks 2, are connected in series.

The battery block 2 is provided with a secondary battery B and an equalization circuit 3. The equalization circuit 3 of each battery block 2 is connected by a transmission path L to the equalization circuit of another battery block 2. The transmission path L is composed of a communication line, for example. The other battery block 2 is disposed close to the host battery block so that the physical distance therebetween is short. Thus, each equalization circuit 3 is connected by the transmission path L to the equalization circuit 3 of another proximal battery block 2 on the basis of physical positional relationship between the battery blocks 2, irrespectively of the connection relationship of the battery blocks 2, that is, the connection relationship of the secondary batteries B included in the battery blocks 2.

As a result, the battery block 2 is able to exchange data via the transmission paths L with another battery block 2 disposed at a position close to the host battery block so that the physical distance therebetween is short.

Figure 2:
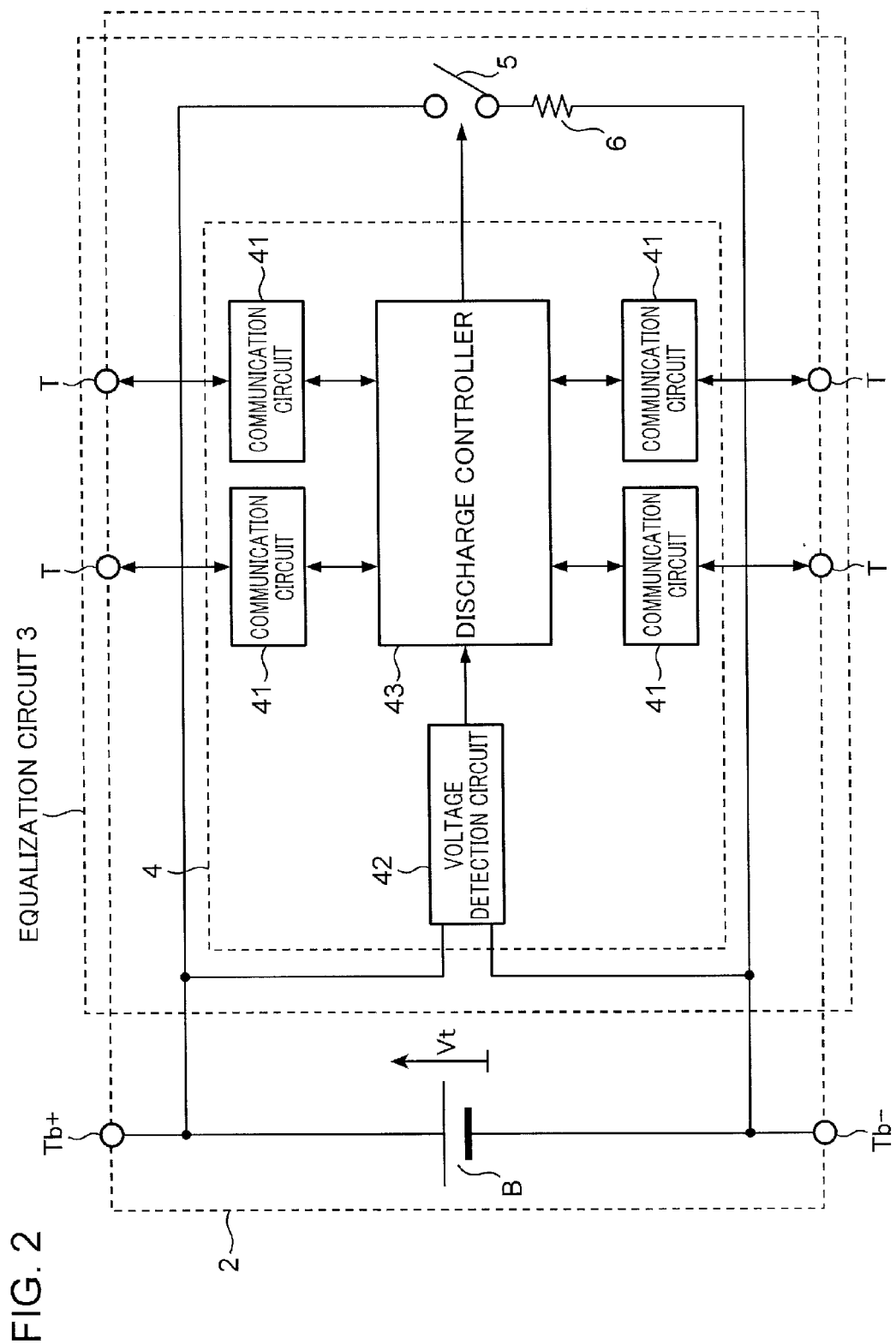
FIG. 2 is a block diagram illustrating an example of the configuration of the battery block shown in FIG. 1.

FIG. 2 is a block diagram illustrating an example of the configuration of the battery block 2 shown in FIG. 1. The battery block 2 shown in FIG. 2 is provided with the secondary battery B, the equalization circuit 3, a positive electrode output terminal Tb+, and a negative electrode output terminal Tb−.

The battery blocks 2 are connected in series, as referred to herein, means that the secondary batteries B provided in the battery blocks 2 are connected in series. For example, when two battery blocks 2 are connected in series, the negative electrode output terminal Tb− of the battery block 2 at a higher potential side is connected to the positive electrode output terminal Tb+ of the battery block 2 at a lower potential side.

The secondary battery B may be, a unit cell for example, an assembled battery in which cells are connected in series for example, or an assembled battery in which cells are connected in parallel for example. Further, the secondary battery B may be an assembled battery in which cells are connected by combining series and parallel connections.

For example, a lithium ion secondary battery is used as the secondary battery B (or as a cell constituting the secondary battery B). The secondary battery B is not limited to the lithium ion secondary battery. Secondary batteries of various types, a nickel hydride secondary battery or a nickel cadmium secondary battery for example, may be used as the secondary battery B.

The positive electrode output terminal Tb+ is connected to the positive electrode of the secondary battery B. The negative electrode output terminal Tb− is connected to the negative electrode of the secondary battery B. The equalization circuit 3 is provided with a controller 4, a switching element 5, a resistor 6, and four connection terminals T.

The switching element 5 is, for example, a semiconductor switching element such as an FET (Field Effect Transistor), or a switching element such as a relay switch. The positive electrode of the secondary battery B is connected to the negative electrode of the secondary battery B through a series circuit of the switching element 5 and the resistor 6.

The controller 4 is provided with four communication circuits 41, a voltage detection circuit 42, and a discharge controller 43. The controller 4 includes, for example, a microcontroller in which a CPU (Central Processing Unit) that executes predetermined computational processing, a nonvolatile ROM (Read Only Memory) that stores a predetermined control program, a RAM (Random Access Memory) that temporarily stores data, an analog-digital converter, and a serial communication interface circuit are integrated in one chip.

For example, the communication circuit 41 is composed of the serial communication interface circuit, and the voltage detection circuit 42 is composed of the analog-digital converter. Further, the CPU functions as the discharge controller 43 by executing the programs stored in the ROM.

The voltage detection circuit 42 detects the voltage between the terminals of the secondary battery B, which is the host voltage, as a terminal voltage Vt. The voltage detection circuit 42 converts the terminal voltage Vt into a digital value and outputs the digital value as host voltage information to the discharge controller 43. The transmission path L is connected to the connection terminal T. The connection terminal T is connected to the connection terminal T of another battery block 2 via the transmission path L.

The discharge controller 43 transmits the information indicating the terminal voltage Vt, as voltage information, to another battery block 2 by the communication circuit 41. Further, the communication circuit 41 receives the voltage information transmitted from the other battery block 2, as other voltage information. The communication circuit 41 outputs the received other voltage information to the discharge controller 43. The communication circuit 41 corresponds to an example of the voltage information output portion and the voltage information acquisition portion.

Locations where the transmission path L is shown by a bidirectional arrow, as in FIG. 1, indicate transmission and reception of voltage information in both directions between two battery blocks 2 (equalization circuits 3) connected by the transmission path L. In the case where voltage information is transmitted unidirectionally from one battery block 2 to another battery block 2, the transmission path L is shown by a unidirectional arrow indicating the flow direction of voltage information, hereinafter.

The discharge controller 43 compares the terminal voltage Vt, which is the host voltage, with the terminal voltage Vt indicated by the other voltage information received by the communication circuit 41. When at least one of terminal voltages Vt indicated by multiple pieces of other voltage information is less than the host voltage, the discharge controller 43 switches the switching element 5 on. As a result, the secondary battery B is discharged by the resistor 6.

Further, as shown in FIG. 1, the number of transmission paths L connected to the battery blocks 2, that is, the number of other battery blocks 2 communicable with each battery block 2, differs depending on the position where the battery blocks 2 are arranged. Therefore, the number of communication circuits 41 may be changed according to the number of transmission paths L connected to each battery block 2. Further, it is also possible to use the battery blocks 2 of identical configurations for all of the battery blocks 2 and open the connection terminals T to which the transmission path L is not connected.

Alternatively, it is possible to provide the battery block 2 with only one communication circuit 41, to assign a communication address to each battery block 2, and to configure the transmission path L as a bus. Further, the discharge controller 43 may perform communication with other battery blocks 2 by designating the communication address of the communication party destination.

Figure 3:
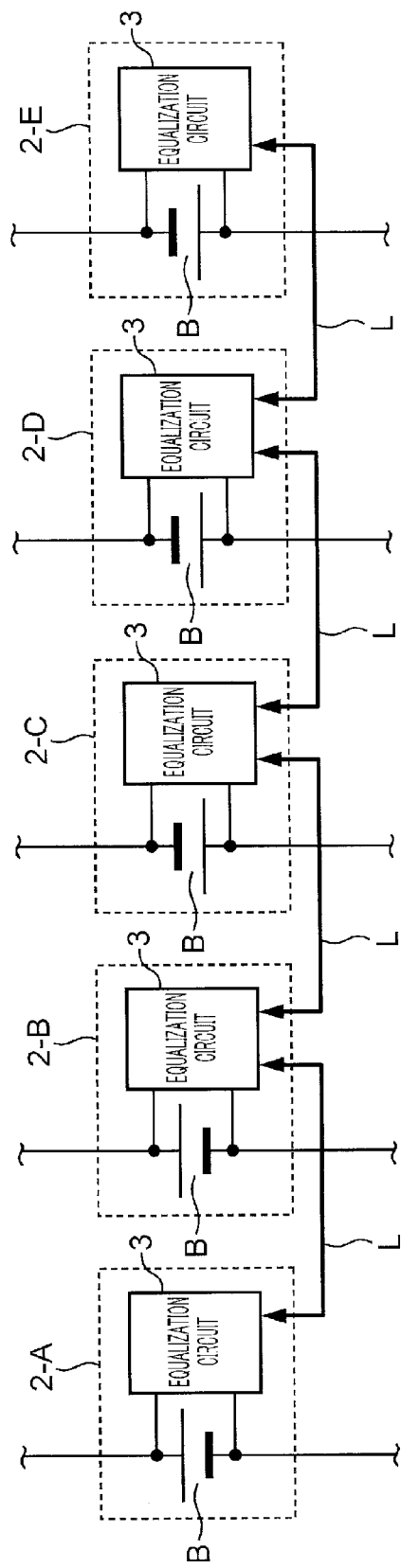
FIG. 3 is a block diagram illustrating a modified example of the power source system shown in FIG. 1.

FIG. 3 is a block diagram illustrating a modified example of the power source system 1 shown in FIG. 1. A power source system 1a shown in FIG. 3 is provided with five battery blocks 2-A, 2-B, 2-C, 2-D, and 2-E. When each of the battery blocks 2 is hereinbelow required to be specified, the battery blocks 2 are specified by assigning a letter after a hyphen. When the battery blocks 2-A, 2-B, 2-C, 2-D, and 2-E are collectively referred, the letter after the hyphen is omitted.

The battery block 2-A and the battery block 2-B are connected by the transmission path L, and voltage information of each other is bidirectionally exchanged between the battery block 2-A and the battery block 2-B. Voltage information of each other is also bidirectionally exchanged between the battery block 2-B and the battery block 2-C, between the battery block 2-C and the battery block 2-D, and between the battery block 2-D and the battery block 2-E.

The operation of the power source system 1a and the battery blocks 2 of the above-described configuration is described below. FIG. 4 is an explanatory drawing for describing the operation of the power source system 1a. FIG. 4 shows how the terminal voltage Vt in the battery blocks 2-A, 2-B, 2-C, 2-D, and 2-E changes with the passage of time from a timing 1 to a timing 9. For example, at the timing 1, the terminal voltages Vt of the battery blocks 2-A, 2-B, 2-C, 2-D, and 2-E are 4.12 V, 4.10 V, 4.08 V, 4.10 V, and 4.04 V, respectively.

Figure 5:
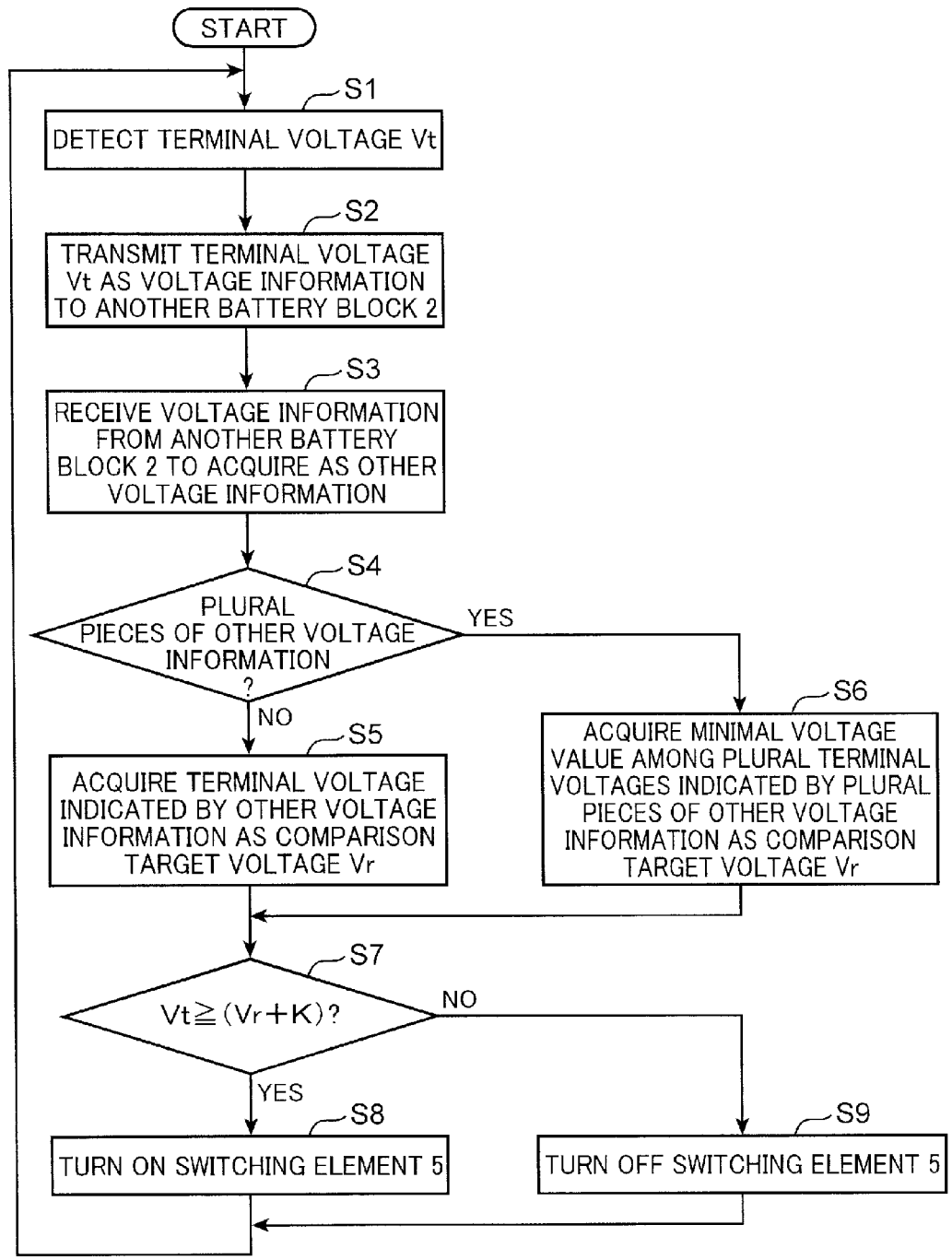
FIG. 5 is a flowchart illustrating an example of the operation of the battery block shown in FIGS. 1 to 3.

FIG. 5 is a flowchart illustrating an example of the operation of the battery block 2. In the description below, the case where the host battery block is the battery block 2-B is mainly described. However, actually all of the battery blocks 2 execute the below-described steps S1 to S9.

First, in each battery block 2, the terminal voltage Vt of the secondary battery B is detected by the voltage detection circuit 42 (step S1). Then, voltage information indicating the terminal voltage Vt detected by the voltage detection circuit 42 is transmitted by the discharge controller 43 using the communication circuit 41 to another battery block 2 connected to the connection terminal T (step S2). In this case, the voltage information (terminal voltage Vt) of the host battery block 2 is transmitted to all other battery blocks 2 connected to the connection terminal T of the host battery block 2. For example, when the host battery block 2 is the battery block 2-B, voltage information indicating 4.10 V is transmitted to the battery blocks 2-A and 2-C.

The voltage information transmitted from another battery block 2 is received by the communication circuit 41, and this voltage information is acquired as the other voltage information by the discharge controller 43 (step S3). At this time, in a case where multiple pieces of voltage information are received by the communication circuits 41, multiple pieces of other voltage information are acquired. When the transmission path L is a bus-type communication path, the exchange of voltage information with other battery blocks 2 is performed by a single communication circuit 41.

At this time, in a case where the host battery block 2 is the battery block 2-B, for example, the voltage information indicating 4.12 V and the voltage information indicating 4.08 V, which have been transmitted from the battery blocks 2-A and 2-C, are received as the other voltage information.

Next, the discharge controller 43 verifies whether or not multiple pieces of other voltage information have been acquired (step S4). When one piece of other voltage information have been acquired (NO in step S4), the terminal voltage indicated by this other voltage information is acquired as a comparison target voltage Vr by the discharge controller 43 (step S5). On the other hand, when multiple pieces of other voltage information have been acquired (YES in step S4), the minimal voltage value, among terminal voltages indicated by the multiple pieces of other voltage information, is acquired by the discharge controller 43 as the comparison target voltage Vr (step S6).

The case where one piece of other voltage information have been acquired in step S4 is equivalent to a case where the number of the other battery block 2 connected by the transmission path L to the host battery block is one, as the battery blocks 2-A and 2-E in FIG. 3 for example. The case where multiple pieces of other voltage information have been acquired is equivalent to a case where other battery blocks 2 are connected by the transmission paths L to the host battery block, as the battery blocks 2-B, 2-C, and 2-D in FIG. 3 for example.

For example, in a case where the host battery block is the battery block 2-B, the comparison target voltage Vr is 4.08 V.

The terminal voltage Vt is then compared by the discharge controller 43 with a voltage value obtained by adding a margin voltage K to the comparison target voltage Vr (step S7). The margin voltage K is a voltage value that has been set in advance with consideration for the control response time of the discharge controller 43 and the accuracy of voltage detection by the voltage detection circuit 42. For example, the margin voltage K is set to 0.02 V. It is not always necessary to add the margin voltage K to the comparison target voltage Vr. The margin voltage K may be set to zero and the condition in step S7 may be Vt>(Vr+K).

When Vt is not less than (Vr+K), the discharge controller 43 advances the process to step S8 (YES in step S7). Vt being not less than (Vr+K) corresponds to Vt being higher than Vr and the difference therebetween being not less than the margin voltage K.

At the timing 1 for example, in the battery block 2-B, Vt is equal to 4.10 V and Vr+K is equal to 4.10 V. Accordingly, since Vt is not less than (Vr+K), the discharge controller 43 advances the process to step S8 (YES in step S7), the switching element 5 is switched on (step S8), and the process moves to step S1.

Thus, as a result of the secondary battery B being discharged by the resistor 6 in the host battery block (battery block 2-B), the terminal voltage Vt of the secondary battery B gradually decreases. Therefore, at the timing 2, the terminal voltage Vt in the battery block 2-B decreases to 4.09 V, for example.

On the other hand, when Vt is less than (Vr+K), the discharge controller 43 advances the process to step S9 (NO in step S7), the switching element 5 is switched off (step S9), and the process moves to step S1.

Steps S1 to S9 are then repeated.

At the timing 2 for example, in the battery block 2-B, a voltage of 4.09 V is acquired as the terminal voltage Vt in step S1, and a voltage of 4.08 V is acquired as the comparison target voltage Vr in step S6. Accordingly, since the terminal voltage Vt is less than (Vr+K) in step S7, the discharge controller 43 advances the process to step S9 (NO in step S7) and the switching element 5 is switched off (step S9).

As a result, the difference between the terminal voltage Vt of the secondary battery B of the battery block 2-B and the comparison target voltage Vr, which is the lowest voltage among the terminal voltages Vt of other secondary batteries B connected by the transmission paths L to the battery block 2-B, becomes a very small voltage less than the margin voltage K.

The above-described operations of steps S1 to S9 are executed by each of the battery blocks 2. Accordingly, the terminal voltage Vt of each battery block 2 approaches a voltage of 4.04 V which is the terminal voltage Vt of the battery block 2-E which is the lowest of the terminal voltages Vt of all of the battery blocks 2, as shown at timings 1 to 9 in FIG. 4. As a result, the variation in the terminal voltages Vt of the battery blocks 2 is reduced and the terminal voltages are equalized.

In this way, the voltage information indicating the terminal voltage Vt of each of the battery blocks 2 in the power source systems 1 and 1a is transmitted to other battery blocks 2 that are directly connected by the transmission paths L to each of the battery blocks 2. Then the discharge of the secondary batteries B in the battery blocks 2 that have received the voltage information is initiated. The terminal voltage Vt reduced by the discharge is further transmitted to another battery block 2. Thus, the battery blocks 2 included in the power source systems 1 and 1a are connected by the transmission paths L in a manner such that the voltage information output from a certain battery block 2 eventually affects all other battery blocks 2 in the power source systems 1 and 1a.

When the margin voltage K is set to zero, the following inconvenience may occur. In a case where the control response time of the discharge controller 43, that is, the time necessary for executing steps S1 to S9, is long, the discharge of the secondary battery B can become excessive and the terminal voltage Vt can become lower than the comparison target voltage Vr during a time period from the start of the discharge of the secondary battery B in step S8 until the stop of the discharge in step S9. In this case, the other battery blocks 2 starts discharging to match the voltage of the battery block 2 which has been discharged excessively and in which the terminal voltage Vt has decreased. As a result, the battery blocks 2 assume the so-called racing state in which the secondary batteries B are discharged in a competitive manner, and the battery blocks 2 can be unnecessarily discharged.

Accordingly, by setting the margin voltage K, it is possible to prevent such a racing state.

The battery blocks 2 may be connected by the transmission paths L such that the voltage information flows in a single row (and bidirectionally) as shown in the power source system 1a. The battery blocks 2 may be connected by the transmission paths L in a matrix-like configuration as shown in the power source system 1. With the matrix-like connection arrangement of the battery blocks 2 by the transmission paths L, the following is made possible by comparison with the case where the battery blocks 2 are connected such that the voltage information flows in a single row. That is, the difference between the maximum and minimum values of the terminal voltage Vt occurring as a result of providing the margin voltage K is reduced and the time necessary for the equalization processing of the terminal voltage Vt is shortened.

Figure 6:
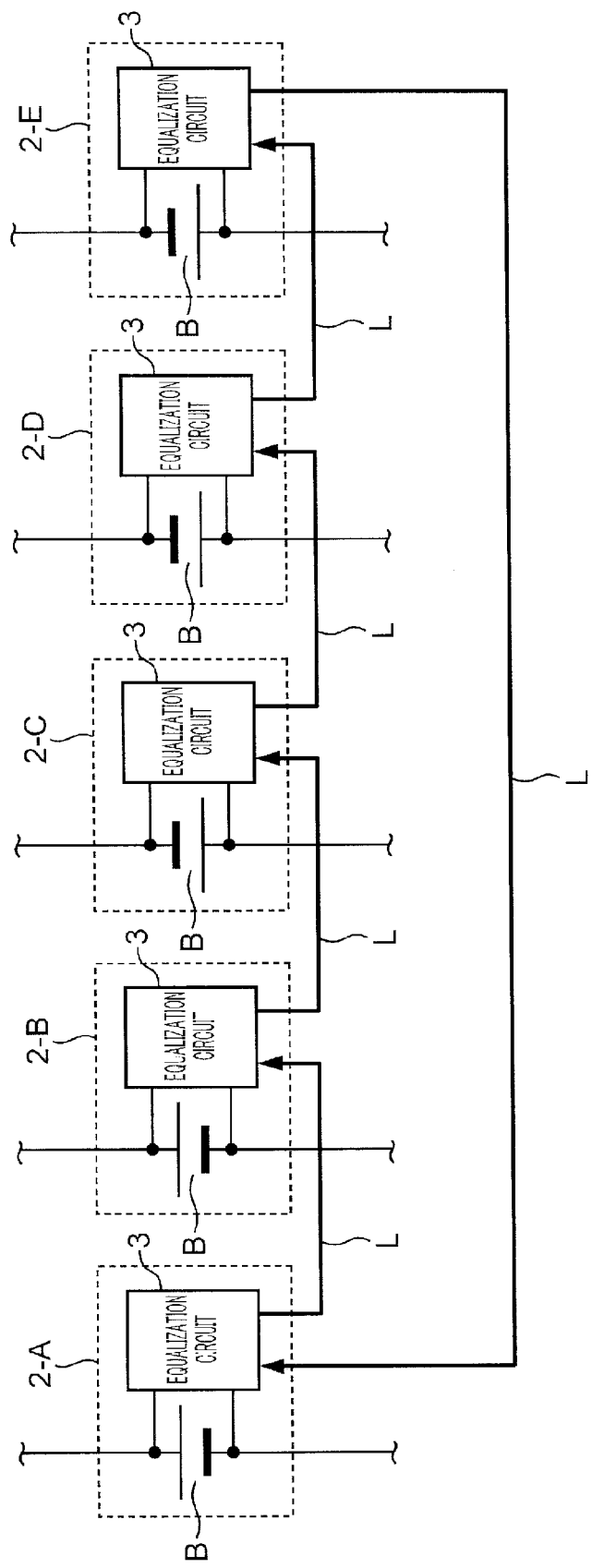
FIG. 6 is a block diagram illustrating a modified example of the power source system shown in FIGS. 1 and 3.

The example, in which the voltage information is transmitted in both directions between two battery blocks 2, is described above. However, the battery blocks 2 may be connected by the transmission paths L in a manner such that the voltage information flows in a loop in one direction, as in a power source system 1b shown in FIG. 6, for example. Since the power source system 1b is connected in a loop by the transmission paths L, as shown in FIG. 6, the battery blocks 2 included in the power source system 1b are connected by the transmission paths L such that the voltage information output from a certain battery block 2 eventually affects all other battery blocks 2 in the power source system 1b.

As a result of the equalization processing being executed by each of the battery blocks 2, the secondary batteries B of the entire power source system are eventually equalized. Therefore, when the number of battery blocks 2 constituting the power source system is changed, the number of secondary batteries B to be used in the power source system may be changed by adding battery blocks 2 and connecting them by the transmission paths L, or by simply disconnecting battery blocks 2 from other battery blocks 2. Thus, in the power source systems 1, 1a, and 1b, the number of secondary batteries may be easily changed while reducing the imbalance of terminal voltage between secondary batteries.

Further, the battery blocks 2 arranged at physically proximal positions may be connected to each other by the transmission paths L, regardless of the connection relationship of the secondary batteries B among the battery blocks 2. Therefore, the wiring length of the transmission paths L may be easily reduced. For example, when voltage-dividing resistors corresponding in number to the cells are connected, as in the background art, the inconvenience occurs such as the number of wires for connecting the voltage-dividing resistors of the corresponding number increases and a large wiring space becomes necessary. Meanwhile, in the power source systems 1, 1a, and 1b, the battery blocks 2 arranged at physically proximal positions are connected to each other by the transmission paths L. Therefore, the wiring length of the transmission paths L may be easily reduced.

An example has been described in which voltage information is exchanged as communication signals. However, the terminal voltage Vt may be output, as is, as voltage information to other battery blocks 2, as shown in FIG. 7 for example.

Figure 7:
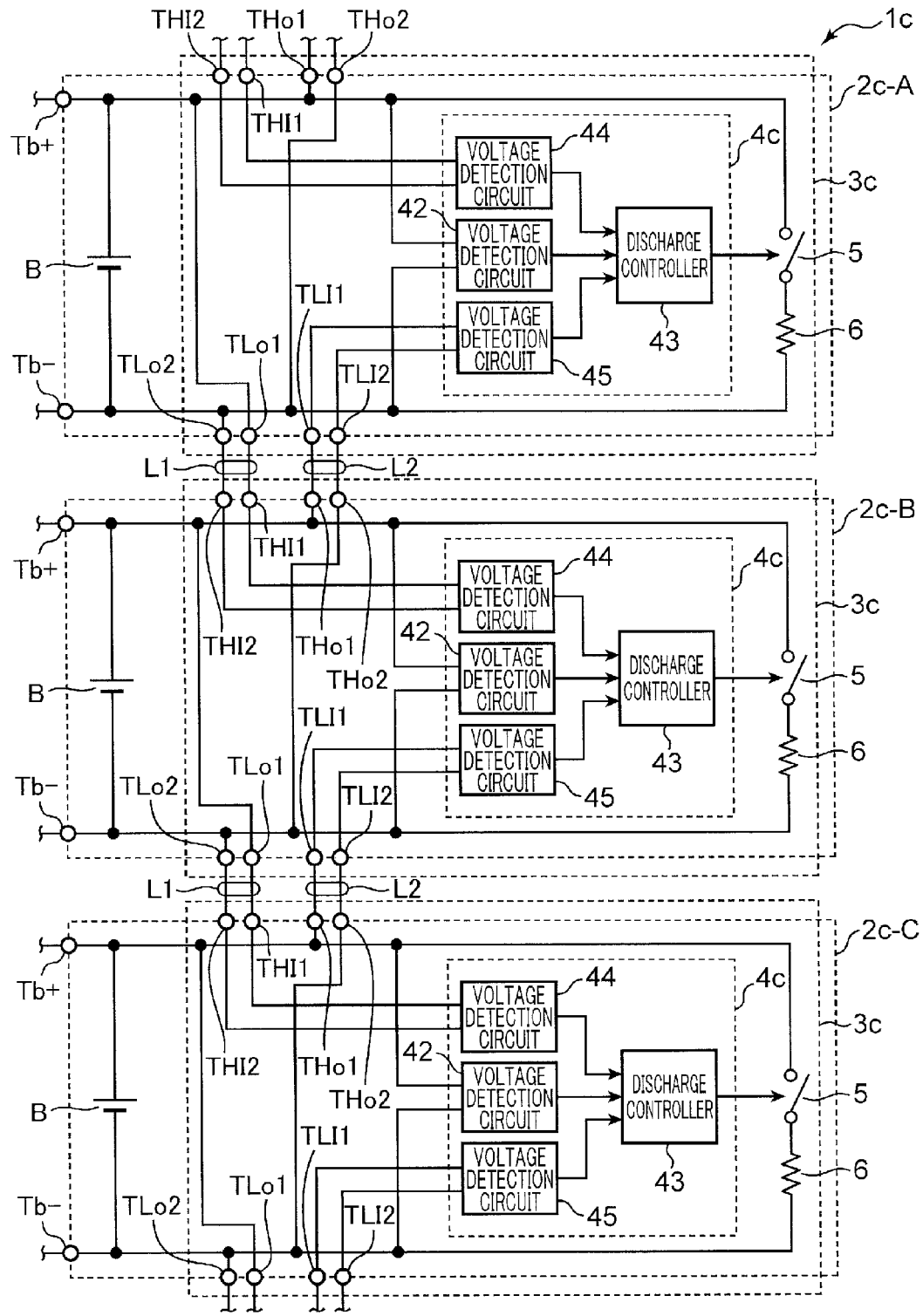
FIG. 7 is a circuit diagram illustrating a modified example of the battery block shown in FIG. 2.

A battery block 2c in a power source system 1c shown in FIG. 7 is provided with a controller 4c instead of the controller 4 in the battery block 2. The controller 4c is provided with voltage detection circuits 42, 44, and 45 and the discharge controller 43. Further, the battery block 2c is provided with a positive electrode output terminal THo1, a negative electrode output terminal TLo2, a positive voltage terminal TLo1, a negative voltage terminal THo2, connection terminals TLI1, TLI2, THI1, and THI2, and voltage detection circuits 44 and 45, instead of the connection terminals T and the communication circuit 41 in the battery block 2. The positive electrode output terminal THo1 and the positive voltage terminal TLo1 are connected to the positive electrode of the secondary battery B. The negative electrode output terminal TLo2 and the negative voltage terminal THo2 are connected to the negative electrode of the secondary battery B. The connection terminals THI1 and THI2 are connected to the voltage detection circuit 44. The connection terminals TLI1 and TLI2 are connected to the voltage detection circuit 45.

A positive electrode output terminal Tb+ and a negative electrode output terminal Tb− may be used instead of the positive electrode output terminal THo1 and the negative electrode output terminal TLo2.

The voltage detection circuits 44 and 45 are composed of analog digital converters similarly to the voltage detection circuit 42, for example.

The power source system 1c is provided with battery blocks 2c, for example, battery blocks 2c-A, 2c-B, and 2c-C. The battery block 2c-B is mainly described below. The positive voltage terminal TLo1 and the negative electrode output terminal TLo2 of the battery block 2c-B are connected by the transmission path L1 to the connection terminals THI1 and THI2 of the battery block 2c-C. The positive voltage terminal TLo1 and the negative electrode output terminal TLo2 correspond to the voltage information output portion outputting the terminal voltage Vt of the battery block 2c-B as voltage information to the battery block 2c-C.

The positive electrode output terminal THo1 and the negative voltage terminal THo2 of the battery block 2c-B are connected to the connection terminals TLI1 and TLI2 of the battery block 2c-A by the transmission path L2. The positive electrode output terminal THo1 and the negative voltage terminal THo2 correspond to the voltage information output portion that outputs the terminal voltage Vt of the battery block 2c-B as voltage information to the battery block 2c-A.

Further, the connection terminals THI1 and THI2 of the battery block 2c-B are connected to the positive voltage terminal TLo1 and the negative electrode output terminal TLo2 of the battery block 2c-A by the transmission path L1. As a result, the terminal voltage Vt output between the positive voltage terminal TLo1 and the negative electrode output terminal TLo2 of the battery block 2c-A is input to the voltage detection circuit 44. The terminal voltage Vt of the battery block 2c-A is output as other voltage information by the voltage detection circuit 44 to the discharge controller 43.

The connection terminals TLI1 and TLI2 of the battery block 2c-B are connected to the positive electrode output terminal THo1 and the negative voltage terminal THo2 of the battery block 2c-C via the transmission path L2. As a result, the terminal voltage Vt output between the positive electrode output terminal THo1 and the negative voltage terminal THo2 of the battery block 2c-C is input to the voltage detection circuit 45. The terminal voltage Vt of the battery block 2c-C is output as other voltage information by the voltage detection circuit 45 to the discharge controller 43.

In this case, the voltage detection circuits 44 and 45 correspond to an example of the voltage information acquisition portion. Further, the transmission path L1 and the transmission path L2 together correspond to the bidirectional transmission path L. Similarly to the power source system 1, the power source system 1c may have a configuration in which the battery blocks 2c are connected matrix-like by the transmission lines L1 and L2. Similarly to the power source system 1a, the power source system 1c may have a configuration in which the battery blocks 2c are connected in a row by the transmission lines L1 and L2.

The power source system 1c may be configured to include only either one of the voltage detection circuits 44 and 45, to include only either one of the transmission lines L1 and L2 so that the voltage information flow be unidirectional, and in a manner such that the battery blocks 2c be connected unidirectionally by the transmission path L in a loop as in the power source system 1b.

For example, a configuration may be used in which the voltage detection circuit 42 is not provided, the voltage detection circuits 44 and 45 are composed of comparators, and the discharge controller 43 is composed of a logical sum (OR) circuit. In this case, it may be configured that the terminal voltage Vt, which is a host voltage, is input to the voltage detection circuits 44 and 45, which are comparators. The voltage detection circuits 44 and 45, which are comparators, then take the respective input voltages as the comparison target voltages Vr and compare the terminal voltage Vt, which is the host voltage, with the comparison target voltages Vr. Further, the voltage detection circuits 44 and 45 may output a high-level signal when Vt (Vr+K) is satisfied, and the discharge controller 43 may switch the switching element 5 on when at least one of the output signals of the voltage detection circuits 44 and 45 is at a high level. The discharge controller 43 may switch the switching element 5 off when the output signals of the voltage detection circuits 44 and 45 are all at a low level.

(Second Embodiment)

Figure 8:
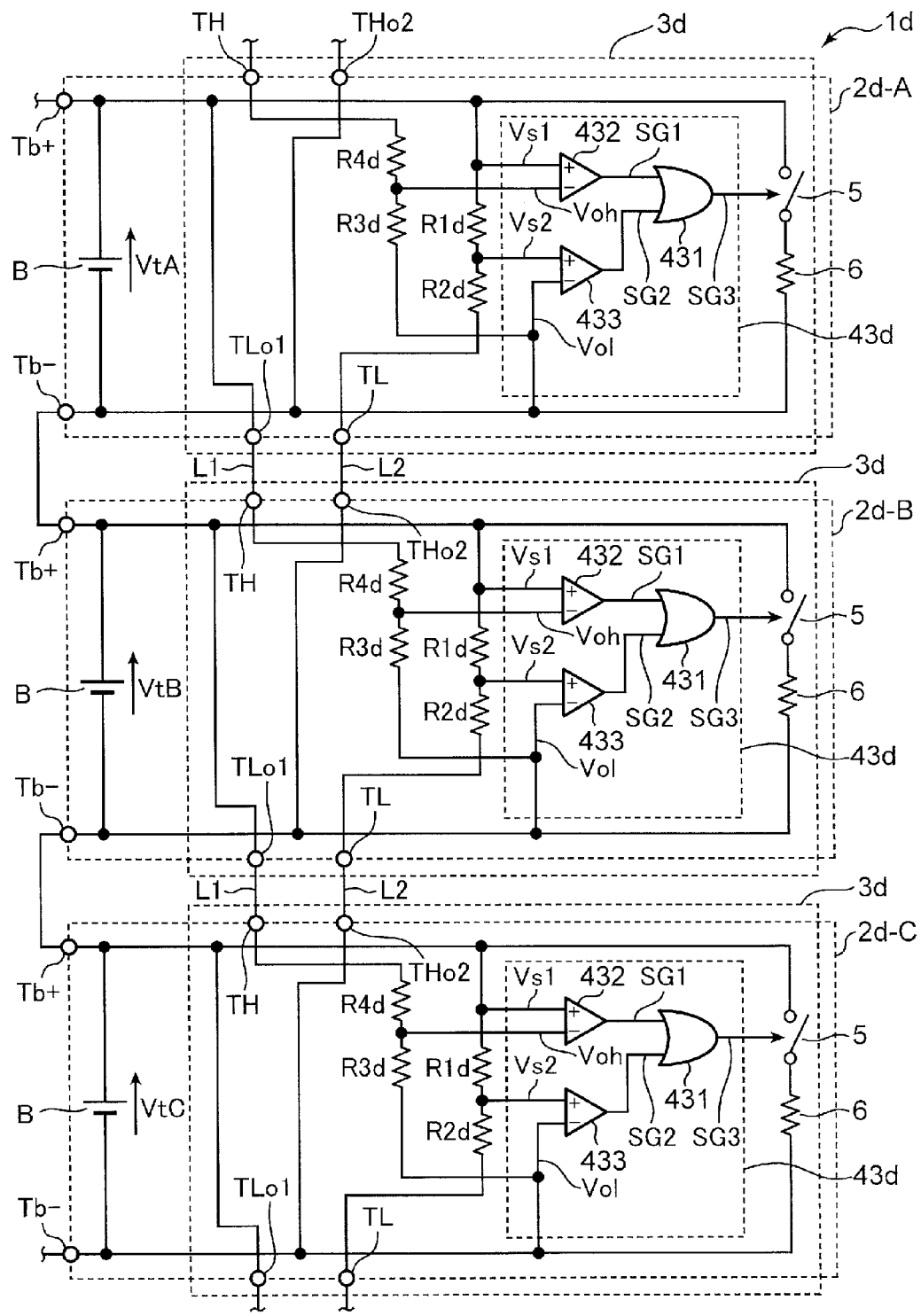
FIG. 8 is a circuit diagram illustrating an example of configurations of the power source system and the battery block according to the second embodiment of the present invention.

The power source system and the battery block according to the second embodiment of the present invention are described below. FIG. 8 is a block diagram illustrating an example of configurations of the power source system and the battery block according to the second embodiment of the present invention. A power source system 1d and a battery block 2d shown in FIG. 8 differ from the power source system 1c and the battery block 2c shown in FIG. 7 in the following aspects.

Specifically, the battery block 2d shown in FIG. 8 is provided with a low-side terminal TL instead of the connection terminals TLI1 and TLI2, and with a high-side terminal TH instead of the connection terminals THI1 and THI2. Further, a voltage-dividing resistor R1d (first voltage-dividing resistor), a voltage-dividing resistor R2d (second voltage-dividing resistor), a voltage-dividing resistor R3d (third voltage-dividing resistor), and a voltage-dividing resistor R4d (fourth voltage-dividing resistor) are provided, and the voltage detection circuits 44 and 45 are not provided. The voltage-dividing resistor R1d and the voltage-dividing resistor R2d have substantially equal resistance values. Further, the voltage-dividing resistor R3d and the voltage-dividing resistor R4d have substantially equal resistance values.

A series circuit of the voltage-dividing resistor R1d and the voltage-dividing resistor R2d is connected between the positive electrode of the secondary battery B and the low-side terminal TL. A series circuit of the voltage-dividing resistor R4d and the voltage-dividing resistor R3d is connected between the high-side terminal TH and the negative electrode of the secondary battery B.

The battery block 2d is provided with a discharge controller 43d instead of the discharge controller 43 of the battery block 2c. The discharge controller 43d is provided with an OR (logical sum) circuit 431 and comparators (comparison portions) 432 and 433.

The positive electrode of the secondary battery B is connected to the (+) terminal of the comparator 432, and the connection point of the voltage-dividing resistor R3d and the voltage-dividing resistor R4d is connected to the (−) terminal of the comparator 432. As a result, the host voltage Vs1, which is the terminal voltage Vt ((+) electric potential) of the secondary battery B, is input to the (+) terminal of the comparator 432. Further, the voltage (electric potential) of the connection point of the voltage-dividing resistor R3d and the voltage-dividing resistor R4d is input to the (−) terminal of the comparator 432 as the other voltage Voh at the high-potential side.

The connection point of the voltage-dividing resistor R1d and the voltage-dividing resistor R2d is connected to the (+) terminal of the comparator 433. The negative electrode output terminal Tb− is connected to the (−) terminal of the comparator 433. With this configuration, the voltage (electric potential) of the connection point of the voltage-dividing resistor R1d and the voltage-dividing resistor R2d is input to the (+) terminal of the comparator 433 as a host voltage Vs2 representing the terminal voltage Vt ((+) electric potential) of the secondary battery B. The negative electrode output terminal Tb− is connected to a positive electrode output terminal Tb+ of another battery block 2d. Accordingly, the output voltage (electric potential) of the secondary battery B of the battery block 2d connected to the lower potential side of the host battery block is input to the (−) terminal of the comparator 433 as the other voltage Vol of a low-potential side.

When Vs1>Voh is satisfied, the comparator 432 outputs a signal SG1 in high-level to the OR circuit 431. When Vs2>Vol is satisfied, the comparator 433 outputs a signal SG2 in high-level to the OR circuit 431.

When Vs1 (Voh+K) is satisfied, the comparator 432 may make the signal SG1 in high-level, and when Vs2 (Vol+K) is satisfied, the comparator 433 may make the signal SG2 in high-level. With this configuration, the risk of occurring the so-called racing state is reduced.

The OR circuit 431 performs logical sum of the outputs of the comparators 432 and 433 and outputs a signal SG3 in high-level to the switching element 5 when either of the output signals is in high-level. The switching element 5 is switched on when the signal SG3 is in high-level to discharge the secondary battery B.

In the power source system 1d shown in FIG. 8, the positive electrode output terminal Tb+ and the negative electrode output terminal Tb− are connected between two adjacent battery blocks 2d. With this configuration, the battery blocks 2d included in the power source system 1d are connected in series, and the secondary batteries B are connected in series.

FIG. 8 shows an example in which three battery blocks 2d-A, 2d-B, and 2d-C are connected in series. In the description below, the battery block 2d-B is taken as a host battery block, the battery block 2d-A is taken as a higher-potential battery block, and the battery block 2d-C is taken as a lower-potential battery block. Further, the terminal voltage of the secondary battery B in the battery block 2d-A is denoted by VtA, the terminal voltage of the secondary battery B in the battery block 2d-B is denoted by VtB, and the terminal voltage of the secondary battery B in the battery block 2d-C is denoted by VtC.

In the power source system 1d of the above-described configuration, the negative electrode output terminal Tb−, the positive voltage terminal TLo1, and the low-side terminal TL of the battery block 2d-A are respectively connected to the positive output terminal Tb+, the high-side terminal TH, and the negative voltage terminal THo2 of the battery block 2d-B. Further, the negative electrode output terminal Tb−, the positive voltage terminal TLo1, and the low-side terminal TL of the battery block 2d-B are respectively connected to the positive electrode output terminal Tb+, the high-side terminal TH, and the negative voltage terminal THo2 of the battery block 2d-C.

Accordingly, in the host battery block 2d-B, the voltage VtB+VtC is divided by the voltage-dividing resistors R1d and R2d. Further, the voltage VtA+VtB is divided by the voltage-dividing resistors R3d and R4d. In addition, the host voltage Vs1 is equal to the terminal voltage (electric potential) Vt of the host battery block 2d-B. The other voltage Vol is equal to the terminal voltage (electric potential) Vt of the battery block 2d-C.

As a result, the host voltage Vs1, the other voltage Voh, the host voltage Vs2, and the other voltage Vol in the host battery block 2d-B are represented by the following Formulas (1) to (4).

$$Vs1 = VtB \tag{1}$$

$$Voh = (VtA + Vtb)/2 \tag{2}$$

$$Vs2 = (VtB + VtC)/2 \tag{3}$$

$$Vol = VtC \tag{4}$$

Accordingly, Vs1>Voh is equivalent to VtB>(VtA+VtB)/2. Therefore, when VtB>(VtA+VtB)/2 is satisfied, the comparator 432 makes the signal SG1 in high-level ("/" means division). Further, VtB>(VtA+VtB)/2 is satisfied when VtB>VtA is satisfied. Therefore, the comparator 432 makes the signal SG1 in high-level when VtB>VtA is satisfied.

Further, since Vs2>Vol is equivalent to (VtB+VtC)/2>VtC, the comparator 433 makes the signal SG2 in high-level when (VtB+VtC)/2>VtC is satisfied. Since (VtB+VtC)/2>VtC is satisfied when VtB>VtC is satisfied, the comparator 433 makes the signal SG2 in high-level when VtB>VtC is satisfied.

The OR circuit 431 performs logical sum of the signal SG1 and the signal SG2, and outputs the logical sum signal thereof as the signal SG3 to the switching element 5.

As a result, the discharge controller 43d discharges the secondary battery B in the host battery block when at least one of the other voltage Voh and the other voltage Vol indicated by multiple pieces of other voltage information is lower than the host voltage VtB. When the lower of the other voltage Voh and the other voltage Vol becomes equal to the host voltage VtB, the OR circuit 431 makes the signal SG3 in low-level to stop the discharge of the secondary battery B.

All of the battery blocks 2d included in the power source system 1d executes the operations same as those of the above-described battery block 2d-B. Accordingly, the terminal voltage Vt of each battery block 2d is brought close to the terminal voltage Vt of the battery block 2d with the lowest terminal voltage Vt, from among all of the battery blocks 2d, in the same manner as in the power source systems 1, 1a, 1b, and 1c. Consequently, the variation among the terminal voltages Vt of the battery blocks 2d is reduced and the terminal voltages are equalized.

Further, each of the battery blocks 2d executes the equalization processing. Hence, the terminal voltages of secondary batteries B in the entire power source system are eventually equalized. Therefore, when the number of battery blocks 2d constituting the power source system is changed, the number of secondary batteries B used in the power source system may be changed by adding the battery block 2d and connecting the transmission lines L1 and L2 or by simply disconnecting one battery block 2d from the other battery block 2d. Thus, the number of secondary batteries in the power source system 1*d* may be easily changed while reducing the imbalance of the terminal voltage among secondary batteries.

Further, since the battery block 2*d* does not use a communication circuit as the battery block 2, the circuitry is easy to simplify. Since the battery block 2*d* uses the terminal voltage Vt as voltage information directly, the control response time may be shortened by comparison with that when information transmission is performed using communication. As a result, the occurrence probability of the so-called racing state is reduced. In addition, the number of connection terminals in the battery block 2*d* is less than that in the battery block 2*c*. Therefore, the number of wires serving as transmission paths in the power source system 1*d* may be reduced with respect to that in the power source system 1*c*.

Figure 9:
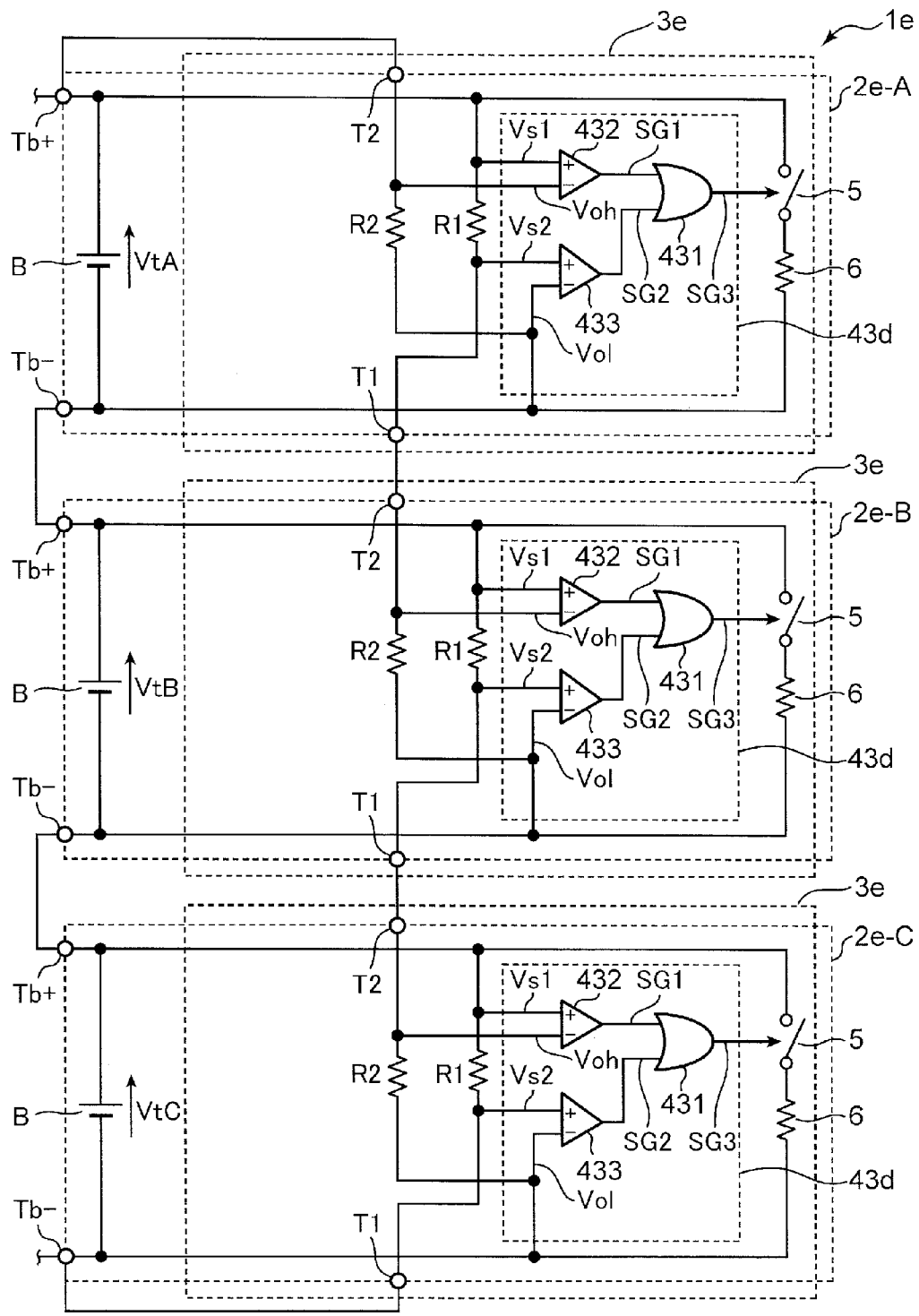
FIG. 9 is a circuit diagram illustrating a modified example of the power source system and the battery block shown in FIG. 8.

It may be configured as a power source system 1*e* shown in FIG. 9. FIG. 9 is a circuit diagram showing a modified example of the power source system 1*d* shown in FIG. 8. The power source system 1*e* shown in FIG. 9 is composed of three battery blocks 2*e* (2*e*-A, 2*e*-B, and 2*e*-C), for example, connected in series. Specifically, the negative electrode output terminal Tb− of the battery block 2*e*-A is connected to the positive electrode output terminal Tb+ of the battery block 2*e*-B. The negative electrode output terminal Tb− of the battery block 2*e*-B is connected to the positive electrode output terminal Tb+ of the battery block 2*e*-C. In the description below, the battery block 2*e*-B is taken as a host battery block, the battery block 2*e*-A is taken as a higher-potential battery block, and the battery block 2*e*-C is taken as a lower-potential battery block.

The battery block 2*e* is different from the battery block 2*d* in the following aspects. The battery block 2*e* does not include the voltage-dividing resistor R1*d*, the voltage-dividing resistor R2*d*, or the low-side terminal TL. Instead, the battery block 2*e* is provided with a resistor R1 (first resistor) including one end connected to the positive electrode terminal of the secondary battery B, and an external terminal T1 (first external terminal) connected to another end of the resistor R1. The external terminal T1 is connected to the (+) terminal of the comparator 433.

Further, the battery block 2*e* does not include the voltage-dividing resistor R3*d*, the voltage-dividing resistor R4*d*, or the high-side terminal TH. Instead, the battery block 2*e* is provided with a resistor R2 (second resistor) including one end connected to the negative electrode terminal of the secondary battery B, and an external terminal T2 (second external terminal) connected to another end of the resistor R2. The external terminal T2 is connected to the (−) terminal of the comparator 432. The resistor R1 and the resistor R2 have substantially the same resistance values.

The external terminal T1 of the battery block 2*e*-A is connected to the external terminal T2 of the battery block 2*e*-B. The external terminal T1 of the battery block 2*e*-B is connected to the external terminal T2 of the battery block 2*e*-C.

In the example shown in FIG. 9, another battery block 2*e* is not connected to the battery block 2*e*-A at a higher potential side than the battery block 2*e*-A. The external terminal T2 of the battery block 2*e*-A, which is thus not connected to another battery block 2*e* at the high-potential side, is connected to the positive electrode output terminal Tb+ of the battery block 2*e*-A. The external terminal T2 is thereby prevented from being in an open state. As a result, the secondary battery B is prevented from being erroneously discharged.

Further, in the example shown in FIG. 9, another battery block 2*e* is not connected to the battery block 2*e*-C at a lower potential side than the battery block 2*e*-C. The external terminal T1 of the battery block 2*e*-C, which is thus not connected to another battery block 2*e* at the low-potential side, is connected to the negative electrode output terminal Tb− of the battery block 2*e*-C. The external terminal T1 is thereby prevented from being in an open state. As a result, the secondary battery B is prevented from being erroneously discharged.

The battery block 2*e* which is not connected to another battery block 2*e* at the high-potential side may be configured to include neither external terminal T2, nor comparator 432, nor OR circuit 431, and to output the output signal SG2 of the comparator 433 to the switching element 5. Further, the battery block 2*e* which is not connected to another battery block 2*e* at the low-potential side may be configured to include neither external terminal T1, nor comparator 433, nor OR circuit 431, and to output the output signal SG1 of the comparator 432 to the switching element 5.

However, the external terminal T2 (free terminal) of the battery block 2*e*, which is not connected to another battery block 2*e* at the high-potential side, is connected to the positive electrode output terminal Tb+ of the host battery block. And the external terminal T1 (free terminal) of the battery block 2*e*, which is not connected to another battery block 2*e* at the low-potential side, is connected to the negative electrode output terminal Tb− of the host battery block. This composition makes it possible to configure the power source system 1*e* using battery blocks 2*e* of identical configuration, without mixing battery blocks of different configurations. Therefore, the battery block 2*e* may be easily managed.

A method for handling the free terminals is not necessarily limited to connection to the positive electrode output terminal Tb+ or the negative electrode output terminal Tb−. For example, when any of the host voltages Vs1, Vs2 and other voltages Voh, Vol becomes lower than a preset reference voltage, it is possible not to perform the comparison process relating to the voltage that is lower than the reference voltage. The end-of-discharge voltage of the secondary battery B, for example, may be used as the reference voltage. The same method for handling the free terminals is applicable to the power source systems 1, 1*a*, 1*b*, 1*c*, and 1*d*.

The voltage (electric potential) of the positive electrode output terminal Tb+, that is, the terminal voltage Vt of the host battery block 2*e*-B, is used as the host voltage Vs1. The voltage at the external terminal T1 is used as the host voltage Vs2. The voltage at the external terminal T2 is used as the other voltage Voh. And the voltage (electric potential) of the negative electrode output terminal Tb− is used as the other voltage Vol.

In such a case, in the host battery block 2*e*-B, the voltage (VtB+VtC) is divided by the resistor R1 of the battery block 2*e*-B and the resistor R2 of the battery block 2*e*-C. The divided voltage is taken as the host voltage Vs2. Further, the voltage (VtA+VtB) is divided by the resistor R1 of the battery block 2*e*-A and the resistor R2 of the battery block 2*e*-B. The divided voltage is taken as the other voltage Voh.

As a result, the host voltage Vs1, the other voltage Voh, the host voltage Vs2, and the other voltage Vol in the host battery block 2*e*-B are represented by above Formulas (1) to (4).

The discharge controller 43*d* operates similarly to the discharge controller 43*d* shown in FIG. 8. As a result, the effects obtained with the power source system 1*e* are similar to those obtained with the power source system 1*d*. Further, the number of resistors and connection terminals in the battery block 2*e* are less than those in the battery block 2*d*, and the circuitry is simplified. Since the number of connection terminals is reduced, the number of wires in the power source system 1*e* may be reduced than that in the power source system 1*d*.

In the example above, the discharge controller 43*d* is composed of a logic circuit of positive logic, but the discharge controller 43*d* may be also composed of a logic circuit of negative logic. The discharge controller 43*d* may be also configured using a microcomputer.

The positive electrode output terminals Tb+ and THo1, the negative electrode output terminals Tb– and TLo2, the external terminals T1 and T2, the positive voltage terminal TLo1, the negative voltage terminal THo2, the low-side terminal TL, the high-side terminal TH, the connection terminals T, TLI1, TLI2, THI1, and THI2 may be, for example, electrodes, connectors, or terminal blocks, or may be wiring patterns such as lands and pads, or may be signal pins of electronic components such as resistors, comparators, and integrated circuits.

The above-described specific embodiments mainly include the invention having the following configurations.

A battery block according to an aspect of the present invention is a battery block for use in a power source system including battery blocks, the battery block includes: a secondary battery; a voltage information output portion which outputs voltage information outside, the voltage information relating to a terminal voltage of the secondary battery; a voltage information acquisition portion which acquires the voltage information output from another battery block as other voltage information; and a discharge controller which causes the secondary battery in a host battery block to discharge when a host voltage is higher than a terminal voltage indicated by the other voltage information, the host voltage being the terminal voltage of the secondary battery in the host battery block.

When battery blocks of such a configuration are combined to configure a power source system, each battery block autonomously outputs the voltage information of the host battery block to other battery blocks by the voltage information output portion. Further, each battery block autonomously acquires the other voltage information output from other battery blocks by the voltage information acquisition portion. When the host voltage is higher than the terminal voltage indicated by the other voltage information, each battery block autonomously discharges the secondary battery of the host battery block by the discharge controller. As a consequence, the imbalance of terminal voltage between secondary batteries provided in the battery blocks is reduced by the autonomous discharge control of secondary batteries performed in each battery block. As a result of each battery block performing autonomously the discharge control of the secondary battery in this way, the imbalance of terminal voltage between secondary batteries in the entire power source system is reduced. Thus, when the number of secondary batteries is changed, it is possible only to change the number of battery blocks used in the power source system, and it is not necessary to change the number of voltage-dividing resistors or resistance value as in the background art. Therefore, the number of secondary batteries may be changed easily while reducing the imbalance of terminal voltage between secondary batteries.

It is preferable that the voltage information acquisition portion acquires multiple pieces of voltage information output from other battery blocks as multiple pieces of other voltage information, and the discharge controller causes the secondary battery in the host battery block to discharge when at least one of terminal voltages indicated by the multiple pieces of other voltage information is lower than the host voltage.

With such a configuration, multiple pieces of other voltage information output from other battery blocks are acquired by the voltage information acquisition portion. The secondary battery of the host battery block is discharged, when at least one of terminal voltages indicated by the multiple pieces of other voltage information is lower than the host voltage. That is, the secondary battery of the host battery block is discharged, when the lowest voltage from among the terminal voltages in other battery blocks is lower than the host voltage. Then, the discharge of the secondary battery of the host battery block is performed by taking a lowest voltage as a target. The lowest voltage is the lowest among the terminal voltages of battery blocks from which the other voltage information has been acquired by the voltage information acquisition portion. And, the imbalance is reduced. Therefore, the imbalance reducing processing is performed at a high speed.

It is preferable that the voltage information output portion outputs the voltage information outside as communication signals.

When battery blocks of such a configuration are combined to configure a power source system, voltage information may be exchanged as communication signals between the battery blocks. Then, communication transmission paths may be wired between the battery blocks provided at physically proximal positions, regardless of the electric connection relationship between the secondary batteries included in the battery blocks. Further, when the communication transmission paths are configured to be wired between the battery blocks provided at physically proximal positions, the amount of wiring necessary to exchange voltage information may be easily reduced.

The voltage information output portion may output the terminal voltage of the secondary battery outside as the voltage information.

With such a configuration, the terminal voltage of the secondary battery is used as voltage information. Thus, it is not necessary to provide a communication circuit for transmitting and receiving voltage information. Therefore, the circuitry may be easily simplified.

Further, it is preferable that the voltage information output portion includes: a positive electrode output terminal connected to a positive electrode terminal of the secondary battery; a first resistor including one end connected to the positive electrode terminal of the secondary battery; and a first external terminal connected to another end of the first resistor, that the voltage information output portion outputs a voltage at the positive electrode output terminal as the voltage information to a higher-potential battery block, and outputs a voltage at the first external terminal as the voltage information to a lower-potential battery block, the higher-potential battery block being another battery block connected in series to the host battery block at a higher potential side than the host battery block, the lower-potential battery block being another battery block connected in series to the host battery block at a lower potential side than the host battery block, that the voltage information acquisition portion includes: a negative electrode output terminal connected to a negative electrode terminal of the secondary battery and connectable to a positive electrode output terminal of the lower-potential battery block; a second resistor including one end connected to the negative electrode terminal of the secondary battery; and a second external terminal connected to another end of the second resistor and connectable to a first external terminal of the higher-potential battery block, and that the voltage information acquisition portion takes a voltage at the second external terminal as other voltage information of the higher-potential battery block, and takes a voltage at the negative electrode output terminal as other voltage information of the lower-potential battery block.

With such a configuration, the negative electrode output terminal and the first external terminal of the host battery block are connected to the positive electrode output terminal and the second external terminal of the lower-potential battery block. Further, the positive electrode output terminal and the second external terminal of the host battery block are connected to the negative electrode output terminal and the first external terminal of the higher-potential battery block. In this case, the voltage, which is obtained by adding up the host voltage and the terminal voltage of the secondary battery of the higher-potential battery block, is divided by the first resistor of the higher-potential battery block and the second resistor of the host battery block. And the divided voltage appears at the second external terminal Then, the voltage at the second external terminal includes information indicating the terminal voltage of the secondary battery of the higher-potential battery block. Therefore, the voltage at the second external terminal may be used as the other voltage information on the higher-potential battery block. Further, the voltage, which is obtained by adding up the host voltage and the terminal voltage of the secondary battery of the lower-potential battery block, is divided by the second resistor of the lower-potential battery block and the first resistor of the host battery block. And the divided voltage appears at the first external terminal. Then, the voltage at the first external terminal includes information indicating the terminal voltage of the secondary battery of the lower-potential battery block. Therefore, the voltage at the first external terminal may be used as the other voltage information on the lower-potential battery block. As a consequence, in a case where a power source system is configured using battery blocks of such a configuration, two battery blocks are connected by two wires connected between the positive electrode output terminal and the negative electrode output terminal and between the first external terminal and the second external terminal. Therefore, the number of wires between the battery blocks may be reduced.

The voltage information output portion may include: a positive electrode output terminal connected to a positive electrode terminal of the secondary battery and connectable to a higher-potential battery block which is another battery block connected in series to the host battery block at a higher potential side than the host battery block; a negative electrode output terminal connected to a negative electrode terminal of the secondary battery and connectable to the positive electrode output terminal of a lower-potential battery block which is another battery block connected in series to the host battery block at a lower potential side than the host battery block; a positive voltage terminal connected to the positive electrode terminal of the secondary battery and connectable to the lower-potential battery block; and a negative voltage terminal connected to the negative electrode terminal of the secondary battery and connectable to the higher-potential battery block. The voltage information acquisition portion may include: a first voltage-dividing resistor including one end connected to the positive electrode terminal of the secondary battery; a second voltage-dividing resistor including one end is connected to another end of the first voltage-dividing resistor; a low-side terminal connected to another end of the second voltage-dividing resistor and connectable to the negative voltage terminal of the lower-potential battery block; a third voltage-dividing resistor including one end connected to the negative electrode terminal of the secondary battery; a fourth voltage-dividing resistor including one end connected to another end of the third voltage-dividing resistor; and a high-side terminal connected to another end of the fourth voltage-dividing resistor and connectable to the positive voltage terminal of the higher-potential battery block. The voltage information acquisition portion may take a voltage divided by the first voltage-dividing resistor and the second voltage-dividing resistor as the host voltage, may take a voltage divided by the third voltage-dividing resistor and the fourth voltage-dividing resistor as other voltage information of the higher-potential battery block, and may take a voltage at the negative electrode output terminal as other voltage information of the lower-potential battery block.

With such a configuration, the negative electrode output terminal, the positive voltage terminal, and the low-side terminal of the host battery block are connected to the positive electrode output terminal, the high-side terminal, and the negative voltage terminal of the lower-potential battery block. Further, the positive electrode output terminal, the high-side terminal, and the negative voltage terminal of the host battery block are connected to the negative electrode output terminal, the positive voltage terminal, and the low-side terminal of the high-voltage-side battery block. In this case, the voltage, which is obtained by adding up the host voltage and the terminal voltage of the secondary battery of the lower-potential battery block, is divided by the first voltage-dividing resistor and the second voltage-dividing resistor. Then, information indicating the host voltage is included in the voltage divided by the first voltage-dividing resistor and the second voltage-dividing resistor. Thus, the voltage divided by the first voltage-dividing resistor and the second voltage-dividing resistor may be used as the host voltage. Further, the voltage, which is obtained by adding up the host voltage and the terminal voltage of the secondary battery of the higher-potential battery block, is divided by the third voltage-dividing resistor and the fourth voltage-dividing resistor. Then, information indicating the terminal voltage of the secondary battery of the higher-potential battery block is included in the voltage divided by the third voltage-dividing resistor and the fourth voltage-dividing resistor. Thus, the voltage divided by the third voltage-dividing resistor and the fourth voltage-dividing resistor may be used as other voltage information on the higher-potential battery block.

It is preferable that the discharge controller causes the secondary battery in the host battery block to discharge when the host voltage is higher than a terminal voltage indicated by the other voltage information and a difference therebetween is not less than a predetermined margin voltage.

With such a configuration, the risk of occurring the so-called racing state, in which the battery blocks discharge the secondary batteries B in a competitive manner, is reduced even when the secondary battery in the host battery block is discharged excessively and the host voltage becomes lower than the terminal voltage of the secondary batteries in other battery blocks.

A power source system according to another aspect of the present invention includes battery blocks, each of the battery blocks is the above-described battery block, wherein the voltage information output portion of each of the battery blocks outputs the voltage information to one other battery block; and the voltage information acquisition portion of each of the battery blocks acquires the other voltage information from one other battery block, which is different from the battery block to which the voltage information output portion of the host battery block has output the voltage information.

With such a configuration, when the host voltage is higher than the terminal voltage of the secondary battery in another battery block, the secondary battery in the host battery block is discharged and the host voltage decreases. As a result, the terminal voltage of the other battery block is reflected in the host voltage. Further, the voltage information indicating the host voltage, in which the terminal voltage of the other battery block has been reflected, is output to another battery block which is different from this battery block. Then, the voltage information is successively transferred and the terminal voltage of each battery block is reflected in the host voltage of other battery blocks. As a result, the terminal voltages of secondary batteries of other battery blocks are reflected in the host voltages of all of the battery blocks included in the battery system, and the imbalance of terminal voltage between the secondary batteries is reduced.

A power source system according to yet another aspect of the present invention includes battery blocks connected in series, each of the battery blocks is the above-described battery block.

With such a configuration, the amount of wires between the battery blocks may be easily reduced while using the terminal voltages of the secondary batteries as voltage information.

A power source system according to still another aspect of the present invention includes battery blocks, each of the battery blocks is the above-described battery block, wherein the voltage information output portion of each of the battery blocks and the voltage information acquisition portion of each of the battery blocks are connected such that the voltage information output from each of the battery blocks affects all other battery blocks.

With such a configuration, the voltage information output from each battery block affects the discharge control of secondary batteries in all other battery blocks. Therefore, the imbalance of terminal voltage between all of the battery blocks included in the power source system may be easily reduced.

INDUSTRIAL APPLICABILITY

The battery block and the power source system according to the present invention may be advantageously used in devices or systems equipped with batteries, such as portable personal computers, digital cameras, video cameras, mobile phones, electric automobiles, hybrid cars, uninterruptable power source devices, load-equalized power sources, and power source systems in which a power generator is combined with a secondary battery.

The invention claimed is:
1. A battery block for use in a power source system including battery blocks, the battery block comprising:
  a secondary battery;
  a first voltage detection circuit which detects a terminal voltage of the secondary battery in a host battery block as a host voltage;
  a voltage information output portion which outputs the terminal voltage of the secondary battery as voltage information outside;
  a voltage information acquisition portion which acquires the voltage information output from another battery block as other voltage information; and
  a discharge controller which causes the secondary battery in the host battery block to discharge when the host voltage is higher than a terminal voltage indicated by the other voltage information,
  wherein the voltage information acquisition portion includes i) a pair of connection terminals to which a terminal voltage of the secondary battery in the other battery block is input and ii) a second voltage detection circuit which detects the terminal voltage input to the pair of connection terminals as the other voltage information.
2. The battery block according to claim 1, wherein
  the voltage information acquisition portion acquires multiple pieces of voltage information output from other battery blocks as multiple pieces of other voltage information, and
  the discharge controller causes the secondary battery in the host battery block to discharge when at least one of terminal voltages indicated by the multiple pieces of other voltage information is lower than the host voltage.
3. The battery block according to claim 1, wherein the discharge controller causes the secondary battery in the host battery block to discharge when the host voltage is higher than a terminal voltage indicated by the other voltage information and a difference therebetween is not less than a predetermined margin voltage.
4. A power source system comprising battery blocks, each of the battery blocks according to claim 1, wherein
  the voltage information output portion of each of the battery blocks outputs the voltage information to one other battery block; and
  the voltage information acquisition portion of each of the battery blocks acquires the other voltage information from one other battery block, which is different from the battery block to which the voltage information output portion of the host battery block has output the voltage information.
5. A battery block for use in a power source system including battery blocks, the battery block comprising:
  a secondary battery;
  a voltage information output portion which outputs voltage information outside, the voltage information relating to a terminal voltage of the secondary battery;
  a voltage information acquisition portion which acquires the voltage information output from another battery block as other voltage information; and
  a discharge controller which causes the secondary battery in a host battery block to discharge when a host voltage is higher than a terminal voltage indicated by the other voltage information, the host voltage being the terminal voltage of the secondary battery in the host battery block,
  wherein the voltage information acquisition portion acquires multiple pieces of voltage information output from other battery blocks as multiple pieces of other voltage information,
  wherein the discharge controller causes the secondary battery in the host battery block to discharge when at least one of terminal voltages indicated by the multiple pieces of other voltage information is lower than the host voltage,
  wherein the voltage information output portion includes:
    a positive electrode output terminal connected to a positive electrode terminal of the secondary battery and connectable to a higher-potential battery block which is another battery block connected in series to the host battery block at a higher potential side than the host battery block;
    a negative electrode output terminal connected to a negative electrode terminal of the secondary battery and connectable to the positive electrode output terminal of a lower-potential battery block which is another battery block connected in series to the host battery block at a lower potential side than the host battery block;
    a positive voltage terminal connected to the positive electrode terminal of the secondary battery and connectable to the lower-potential battery block; and
    a negative voltage terminal connected to the negative electrode terminal of the secondary battery and connectable to the higher-potential battery block,
  wherein the voltage information acquisition portion includes:

a first voltage-dividing resistor including one end connected to the positive electrode terminal of the secondary battery;

a second voltage-dividing resistor including one end is connected to another end of the first voltage-dividing resistor;

a low-side terminal connected to another end of the second voltage-dividing resistor and connectable to the negative voltage terminal of the lower-potential battery block;

a third voltage-dividing resistor including one end connected to the negative electrode terminal of the secondary battery;

a fourth voltage-dividing resistor including one end connected to another end of the third voltage-dividing resistor; and a high-side terminal connected to another end of the fourth voltage-dividing resistor and connectable to the positive voltage terminal of the higher-potential battery block, and wherein the voltage information acquisition portion takes a voltage divided by the first voltage-dividing resistor and the second voltage-dividing resistor as the host voltage, takes a voltage divided by the third voltage-dividing resistor and the fourth voltage-dividing resistor as other voltage information of the higher-potential battery block, and takes a voltage at the negative electrode output terminal as other voltage information of the lower-potential battery block.

6. A power source system comprising battery blocks, each of the battery blocks according to claim 1, wherein the voltage information output portion of each of the battery blocks and the voltage information acquisition portion of each of the battery blocks are connected such that the voltage information output from each of the battery blocks affects all other battery blocks.

7. A battery block for use in a power source system including battery blocks, the battery block comprising:

a secondary battery;

a voltage information output portion which outputs voltage information outside, the voltage information relating to a terminal voltage of the secondary battery;

a voltage information acquisition portion which acquires the voltage information output from another battery block as other voltage information; and a discharge controller which causes the secondary battery in a host battery block to discharge when a host voltage is higher than a terminal voltage indicated by the other voltage information, the host voltage being the terminal voltage of the secondary battery in the host battery block, wherein the voltage information acquisition portion acquires multiple pieces of voltage information output from other battery blocks as multiple pieces of other voltage information, wherein the discharge controller causes the secondary battery in the host battery block to discharge when at least one of terminal voltages indicated by the multiple pieces of other voltage information is lower than the host voltage, wherein the voltage information output portion includes:

a positive electrode output terminal connected to a positive electrode terminal of the secondary battery;

a first resistor including one end connected to the positive electrode terminal of the secondary battery; and a first external terminal connected to another end of the first resistor, wherein the voltage information output portion outputs a voltage at the positive electrode output terminal as the voltage information to a higher-potential battery block, and outputs a voltage at the first external terminal as the voltage information to a lower-potential battery block, the higher-potential battery block being another battery block connected in series to the host battery block at a higher potential side than the host battery block, the lower-potential battery block being another battery block connected in series to the host battery block at a lower potential side than the host battery block, wherein the voltage information acquisition portion includes:

a negative electrode output terminal connected to a negative electrode terminal of the secondary battery and connectable to a positive electrode output terminal of the lower-potential battery block;

a second resistor including one end connected to the negative electrode terminal of the secondary battery; and a second external terminal connected to another end of the second resistor and connectable to a first external terminal of the higher-potential battery block, and wherein the voltage information acquisition portion takes a voltage at the second external terminal as other voltage information of the higher-potential battery block, and takes a voltage at the negative electrode output terminal as other voltage information of the lower-potential battery block.

8. A power source system comprising battery blocks connected in series, each of the battery blocks according to claim 5.

* * * * *